No. 720,604. PATENTED FEB. 17, 1903.
J. F. McELROY.
ELECTRIC LIGHTING SYSTEM.
APPLICATION FILED JAN. 24, 1901.
NO MODEL. 2 SHEETS—SHEET 1.

UNITED STATES PATENT OFFICE.

JAMES F. McELROY, OF ALBANY, NEW YORK.

ELECTRIC-LIGHTING SYSTEM.

SPECIFICATION forming part of Letters Patent No. 720,604, dated February 17, 1903.

Application filed January 24, 1901. Serial No. 44,640. (No model.)

*To all whom it may concern:*

Be it known that I, JAMES F. McELROY, a citizen of the United States of America, and a resident of Albany, in the county of Albany and State of New York, have invented certain new and useful Improvements in Electric-Lighting Systems, of which the following is a specification.

My invention relates to apparatus for controlling and regulating the transmission of electricity from a dynamo or storage battery to a lamp or other working circuit; and the objects of my invention are, first, to automatically control the electricity transmitted from a dynamo to a lamp or other working circuit in such manner that the voltage delivered to the working circuit shall remain constant, that delivered to the battery being higher than that delivered to the lamps; second, to provide a means for automatically regulating the flow of electricity from the dynamo to the lamp or other working circuit in such a manner that when resistance is thrown in the rheostat-arm will operate step by step and be held positively in position at each step, maintaining a constant flow of electricity to the working circuit at all times so long as the number of lamps therein and the charging-current delivered to the battery remains unchanged; third, devices for supplying electricity to a lamp or other working circuit from a dynamo and storage battery so arranged and connected up that as long as the dynamo generates sufficient voltage to do so it will both charge the storage battery and transmit a constant voltage to the working circuit. When the voltage of the dynamo falls below that of the battery, the dynamo is open-circuited and the storage battery maintains the constant voltage-supply to the working circuit, together with various devices and apparatus hereinafter more particularly set forth and described. I attain these objects by means of suitable mechanism, of which one form is illustrated in the accompanying drawings, in which—

Figure 1:
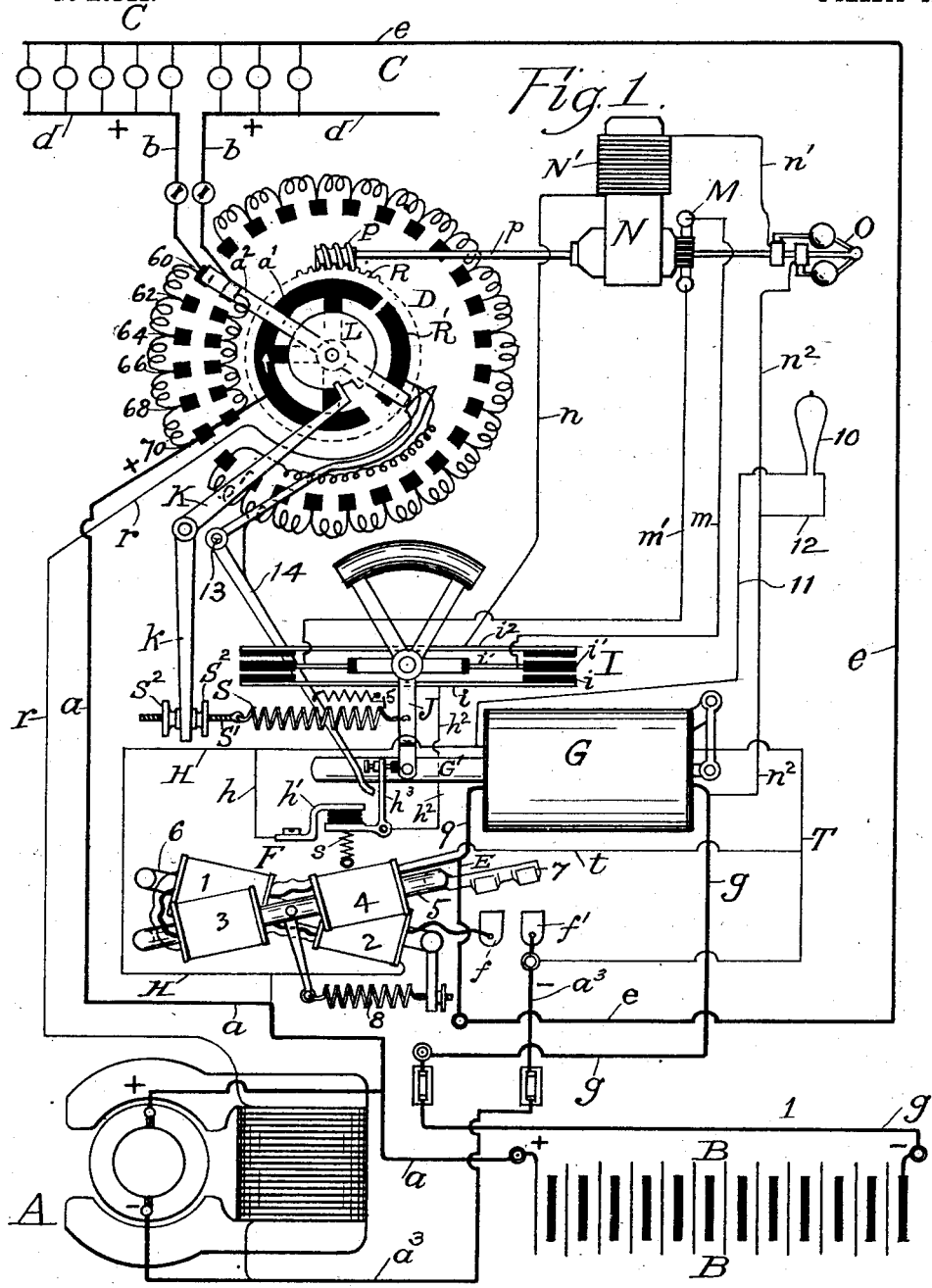
Figure 2:
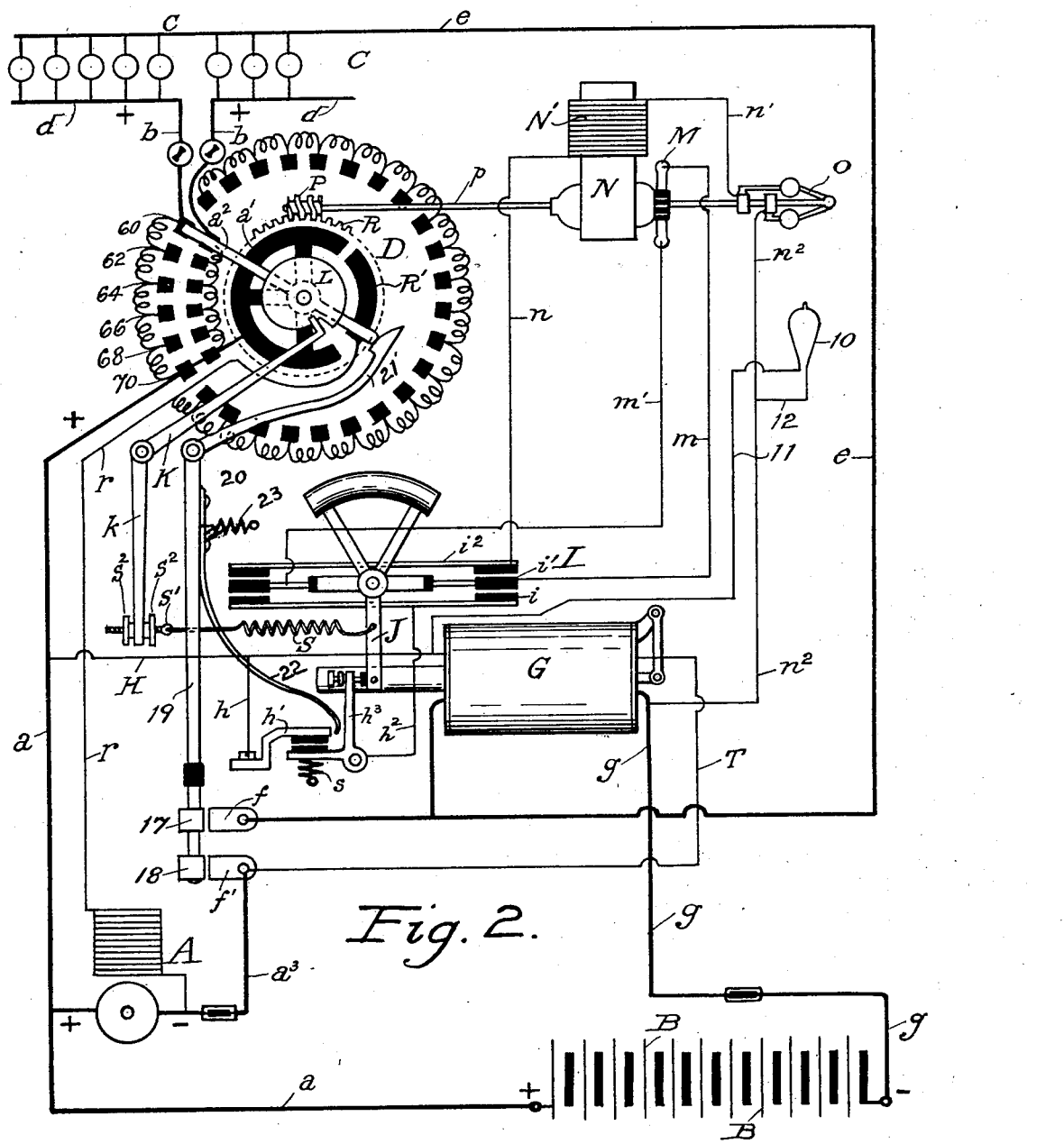

Figure 1 is a diagrammatic view, partly in elevation, and Fig. 2 is a diagrammatic view, partly in elevation, of a modified form of my invention.

Similar characters refer to similar parts throughout both views.

The dynamo A is suitably mounted and is connected with the storage battery B by the wire $a$, also connected to the lamp or working circuit C by means of the wire $a$, rheostat-plate $a'$, and rheostat-arm $a^2$, and wires $b$ $b$.

The negative wire $e$ of the lamp-circuit C is branched at E, a portion connecting with the heavy wire coils on the two limbs of the automatic series switch F, which are pivoted like scissors-blades, another portion connecting with the heavy wire 9 in the potential-solenoid G. The end of the branch going through the automatic series switch F is connected with the contact $f$. The wire passing through the potential-solenoid G connects with the wire $g$, which passes to the negative pole of the storage battery B. The negative wire $a^3$ of the dynamo connects with the contact $f'$ of the automatic series switch F. The wire $a$ is connected to the wire H, which passes through the automatic switch F and is connected with fine-wire coils, also wound upon the limbs of said switch, and passes therefrom by wire $l$ to wire T, which connects with the wire $a^3$ to the negative pole of the dynamo. The wire H is also connected with the fine wire forming the shunt-coil of the potential-solenoid G additional to the heavy wire coil of the solenoid mentioned above as contained in the storage-battery branch of the main circuit. From thence it is connected with the wire T, leading to the wire $a^3$ and to the negative pole of the dynamo. To the wire H is also connected wire $h$, connecting the current-breaker $h'$, the lever $h^3$ of the current-breaker being connected to one of the divisions $i$ of the current-director I by means of the wire $h^2$. The lever or arm $h^3$ is also arranged to make contact with arm J, leading to the middle section $i$ of the director. Current-breaker $h'$ is provided with a spring $s$, the resiliency of which tends to keep the two parts of the current-breaker in contact. The plunger G' of the potential-solenoid G is connected by the arm J to the middle section $i'$ of the current-director I. The projection of said arm J or any suitable arrangement on the plunger G' is arranged to come in contact with the arm $h^3$ of the current-breaker $h'$ and to separate the parts of the current-breaker. An adjustable spring S connects the arm J with one arm $k$ of a bell-crank lever. The other arm K of said lever is arranged to come in contact with the periphery of the cam-plate L on the rheostat D, the tendency of the spring S being to act against the pull of the magnet G. The spring S is connected to the bell-crank lever-arm $k$, preferably by means of a screw-bolt S', and is adjustable by means of nuts $S^2$ $S^2$ or in any suitable manner.

The current-director I is composed, preferably, of three sections $i$ $i'$ $i^2$, the section $i$ being connected by the wire $h^2$ to the current-breaker $h'$, as hereinbefore stated. The middle section $i'$ is connected by the bar J to the plunger G' and also by the wire $m$ to the armature M of the motor N and at the opposite end of said middle section by the wire $m'$ to the other terminal of the armature M. The upper section $i^2$ is connected, by means of the wire $n$, to the field N' of the motor. The other terminal of the field of the motor N' is connected by, means of the wire $n'$, to the governor O and thence by the wire $n^2$ to the wire $g$, which connects with the negative pole of the storage battery B.

The motor N operates the rheostat-arm $a^2$ by means of the screw P on the shaft $p$, engaging with the gear R, to which the rheostat-arm $a^2$ is attached in any suitable manner. A sectional plate R' is preferably arranged in the path of the rheostat-arm $a^2$, which is connected by the wire $r$ to the field of the dynamo. I arrange two sets of resistances in my rheostat—one the lamp or working circuit resistance, the other a resistance for regulating the flow of current to the field-coils. The rheostat-arm $a^2$, controlled by the motor N, is arranged to throw out entirely both resistances by motion in one direction to a stop and adapted on a rise of voltage beyond that for which the working or lamp circuit is adjusted to throw in the resistance of the working-circuit resistance step by step until said working circuit is all in, when a further movement of said rheostat-arm throws in resistance in series with the field-coils, thus maintaining the voltage of the working circuit constant, but at a point lower (by reason of the inserted resistance) than the voltage of the dynamo itself. I arrange the said lamp or working resistance with a series of rheostat-contacts connected with the wires $b$ $b$ and with the wire $a$, connected with one of the poles of the dynamo. I arrange a plate L, having a portion thereof cam-shaped, to engage with the arm K of the bell-crank lever, the other arm of which is connected with the spring S, as hereinbefore described, the cam-face so formed that as the rheostat-arm $a^2$ moves so as to throw resistance into the lamp-circuit it will automatically regulate the tension of the spring S on the plunger G', so that in each position of the rheostat-arm $a^2$ the action of the spring S on the plunger G' will counterbalance the same against the pull of the potential-solenoid. This gradual increase of spring tension will compel shunt-magnet G to respond to a gradually-increasing electromotive force.

The operation of my regulating device is as follows: I arrange a dynamo adapted when running normally to furnish seventy volts, for instance. I wish to supply a constant voltage to the lamp-circuit of sixty volts and a charging voltage of seventy to the battery. The current will flow from the positive pole of the dynamo when the main switch is closed directly to the storage battery, charging the battery, and at the same time will flow to the rheostat-contacts, and when the parts are in starting condition (shown in the drawings) to the plate $a'$ of the rheostat and the arm $a^2$ and to the lamp-circuit. The potential-solenoid G, which is in shunt between the mains of the dynamo, will when the speed at starting is sufficient to give the dynamo the lamp-voltage—say sixty volts—draw the plunger, allow contact to be made by the current-breaker $h'$, cause the middle portions $i'$ of the current-director to meet their adjacent contacts, and operate the motor, which will throw in resistance by causing the arm $a^2$ of the rheostat to move to the next position, (denominated 62.) There will still be delivered to the working circuit sixty volts. The position of the plunger will be held positive, being regulated by the bell-crank lever-arm K on the inclined edge of the plate L, which adjusts the tension of spring S, so that magnet G will only respond to sixty-two volts. When the dynamo picks up, so as to increase the voltage, the arm $a^2$ of the rheostat will move to 64 and the position of the plunger will be regulated as before, a constant supply of sixty volts being furnished the working circuit. This will continue until the rheostat-arm has passed the seventy-volt position, when further movement of the rheostat-arm $a^2$ will throw in resistance in series with the field-coils and prevent further rise of the voltage of the dynamo. When the speed of the dynamo decreases, it is apparent that the operation of the motor will be reversed until the rheostat-arm reaches the position shown in the drawings denominated 60, when the switch will be opened and the storage battery will directly furnish the power for the working circuit.

I do not limit myself to one working circuit, since I may use a plurality of working circuits and provide a plurality of resistances placed in series with said circuits, each resistance being adjusted to the amperage of the circuit in which it is placed, said resistances being divided into similar parts. It will then be necessary for me to simply provide a rheostat-arm adapted to put an equal number in each of the resistances of the circuits, so as to maintain the voltage of the circuits equal, and I thus arrange so that one or more of these circuits may be cut off without disturbing the remaining circuits.

The purpose of the circuit-breaker $h'$ is to compel the operation of motor N by the battery, even if the dynamo has stopped and the main switch is opened and the final breaking of the battery-current through the motor by the circuit-breaker $h'$ when the rheostat has been brought by the motor to its "off" position.

The automatic series switch F is made up of four magnets 1, 2, 3, and 4, two upon the bar 5 and two upon the bar 6. The bars 5 and 6 tend to attract or repel each other, depending upon the current passing through the magnets, the two bars being pivoted together at their centers. Upon each of the magnets I arrange two coils, one a series coil of heavy wire from the dynamo, the other coil being of fine wire, which is in shunt with the dynamo. The contact-piece 7 is attached to one arm 5 of the automatic series switch F. When the current through the magnet magnetizes the arms 5 and 6, so that they attract each other, the switch-arm 7 is brought into contact with the contact-pieces $f f'$. The large wire passing through each of the magnets 1, 2, 3, and 4 is connected with the large wire in the potential-solenoid G. As thus arranged when the current is passing through the magnets 1, 2, 3, and 4 the switch will be closed unless a sufficient degree of current is discharged by the storage battery in a reverse direction to cause the influence of the series wire of the dynamo to overcome the influence of the small wire upon the arms 5 and 6, and thereby demagnetize them, and then cause the spring 8 to draw the magnets apart and break the contacts of the switch.

The potential-solenoid G is made up of two coils, (not illustrated,) one of which is a series coil of a few turns of heavy wire, the other a shunt-coil of a large number of turns of fine wire. The fine wire is connected by the wire H to the positive wire of the dynamo and also by the wire T to the negative pole of the dynamo. The heavy wire is connected with the wire 9, therefore with the contact-plate $f$, and also with the wire $g$, connecting with the negative pole of the storage battery. The potential-solenoid thus has a shunt-wire to the poles of the dynamo and a series wire to the storage battery, the purpose of which will be described later.

I sometimes arrange for convenience a lamp 10, connected to the positive wire H by the wire 11 and to the negative wire $g$ by the wire 12, the lamp 10 being used to light the box in which the regulating apparatus is placed.

In order that the current-breaker $h'$ shall not be operated so as to break the contact except at the desired time, I preferably arrange a bell-crank lever, pivoted at 13, having an arm 14 arranged to rest against the arm $h^3$ of the current-breaker, maintained in position by the spring 15, which will prevent the operation of the plunger G' with its projecting arm J from breaking contact of the current-breaker $h'$ except when the end of the rheostat-arm $a^2$ reaches the point denominated "60" on the rheostat, as shown in Fig. 1. This is for the purpose of allowing the motor N to operate the rheostat-arm $a^2$ and cause it to be brought to the point 60, where all resistance is out in case a fuse blows out or for any reason the dynamo should suddenly fail to operate and the automatic series switch F open the working circuit. The rheostat-arm would then be operated by current from the storage battery only to return it to the position marked "60;" otherwise the rheostat-arm $a^2$ would fail to return to position 60, or if it returned by the aid of the storage battery the battery-circuit would stand closed through the motor N, and the charge of the battery would soon become depleted.

I have shown in Fig. 2 a modified form of my regulating device, which is the same as that shown in Fig. 1 except that I have eliminated the automatic series switch F. In this arrangement the contact is made between the contact-plates $f f'$ by means of the contact-plates 17 and 18 on the arm 19 of the bell-crank lever pivoted at 20, which bell-crank lever has an arm 21 adapted to engage with the rheostat-arm $a^2$ when the rheostat-arm is on the point denominated "60." At all times when the rheostat-arm is off the contact the contact-plates 17 and 18 are in engagement with the contact-plates $f f'$, connected with the arm 19 of the bell-crank lever. I arrange the arm 22, preferably made elastic, in contact with the arm $h^3$ of the current-breaker to operate the same as the arm 14 does in Fig. 1. Spring 23 tends to draw the arm 19 of the bell-crank lever so as to make contact between the contact-plates 17 and 18 and the contacts $f f'$ and to keep the current-breaker closed except when the arm $a^2$ of the rheostat reaches the contact-plate 60, when contacts would be broken, as hereinbefore set forth.

In my regulator the potential-solenoid G, which is composed of a compound coil consisting of a shunt-coil of high resistance and a series coil, said series being in the circuit between the dynamo and the storage battery, but independent of the circuit from the dynamo to the working circuit, controls the motion of the rheostat, limiting the flow of current to the storage battery when the storage battery is nearly depleted and increasing the flow to the storage battery when the storage battery is nearly charged. This is an important part of my invention, as I am enabled to charge a storage battery in such a manner as to prevent the heavy rush of current through the battery when it is nearly depleted, and thus prevent buckling of plates and loss of current which results from charging at too high a rate of charge. I am also enabled to taper the charging rate as the charging operation proceeds, so that when the battery becomes fully charged the rate of flow is reduced to a minimum.

As a practical illustration I will say that as ordinarily constructed the coil G contains six turns of the series coil and about eighteen thousand turns of the fine wire in the shunt-coil. When the operation of charging a depleted battery begins, the voltage of the charging-current drops to fifty-eight (58) volts with a flow of twenty (20) amperes into the battery. As the charging operation continues the voltage continues to rise until it reaches seventy (70) volts, when the battery is fully charged and the current-flow to the battery drops to about eight (8) amperes. It will be observed that at all stages of charging the rate of flow is maintained at the exact rate as prescribed by the battery makers for charging their batteries. With my apparatus this is done automatically, and in accordance with the ordinary working of the apparatus I have found in practice that with my apparatus, which thus regulates automatically the charging of the battery, as well as the flow to the working circuit, the life of the battery is materially prolonged and that I am absolutely free from the difficulties with batteries which others are subject to who use a regulator whose controlling-coil is made of a shunt-coil alone.

By placing the series-coil in the potential-solenoid between the dynamo and the storage battery and independent of the lamp-circuit I am enabled to operate the lamps without in the slightest degree affecting the rate of charging the storage battery.

I may add that the described arrangement permits the dynamo to start at the lamp-pressure, not at the battery-charging pressure. The lamps are thereby transferred from the battery to the dynamo without such flickering as would be caused if the potential applied to them were changed when the transfer is made. The dynamo-pressure is then raised by increase of speed until it reaches the point required for charging the batteries, the potential applied to the lamps in the meanwhile being maintained substantially constant by the gradual insertion of the resistance in series therewith. I am also enabled to deliver a widely-varying current from the dynamo, such as will meet all conditions of service. Thus when the lamps are turned off and the battery is fully charged the dynamo will still be connected in whenever the speed rises and brings the dynamo up to the critical potential, yet it will deliver little or no current. On the other hand, the connection may occur while the lamps are all in circuit and the battery depleted by a long stop of the dynamo. In such case the dynamo will be connected up as before and under the same conditions; but it will immediately deliver a very large current—for example, seventy amperes per car—in contrast to the little or no current of the other condition. It is one of the leading advantages of my system that it will meet such widely-varying conditions, and it is due to the connecting-up switch that acts independently of the amount of current desired in the lamps and battery and also to the current-adjusting regulator, which independently of the connecting-up switch serves to adjust the amount of current which the machine delivers, although the regulator has a controlling-coil which does not respond to the amount of current generated, but only to the lamp resistance, the dynamo speed, and counter electromotive force of the battery. In addition the differentiating appliances I have described impose a difference in the pressure or potential applied to lamps from that applied to the battery without, however, interfering with the current-adjusting action of the regulator, which still continues to give to the lamps a volume of current inversely commensurate with the lamp resistance and to the battery a volume of current inversely commensurate with its counter electromotive force, which counter electromotive force in turn depends on the condition of the battery charge. I am unaware of any other electric-lighting apparatus which has all of these characteristics and which particularly is capable of meeting a situation wherein the connection and disconnection of the dynamo is liable to occur with extreme irregularity under every possible condition of battery charge and in which the lamps are to be always available in any desired number and to be always worked from the dynamo (to avoid the conversion loss in the battery) so long as the speed is up to the required point.

I do not claim, broadly, herein the modification shown in Fig. 2 so far as it relates to the construction in which a single controlling-magnet is employed which governs the closure of the main switch between dynamo and line, as well as the regulation of the dynamo. That matter is a separate invention which is embraced in a separate application for patent filed by me. I likewise have embraced, broadly, in another application the feature of the modifying-coil in the battery branch and the feature of the motor operated by the storage battery and the limitation of its speed by a centrifugal governor; also, the arrangement of the lamps in groups with individual resistances in each group. It is also to be understood that the apparatus herein shown is but an illustration of my invention, being that form which I now regard as the best out of the various forms in which the invention may be embodied. I likewise intend the following claims to distinguish my invention from other arrangements wherein a constant current is employed with a variable potential and wherein also the potential is not adjusted, but is left to be determined by the load which may chance to be imposed at any particular moment upon the dynamo.

It is to be understood the lamp-potential, which is designated as the "point of action" for which the connection-switch is adjusted, means the lower potential than that required for charging the battery, such as is not too great for the lamps and requiring the insertion of the lamp resistance to protect them.

What I claim as my invention, and desire to secure by Letters Patent, is—

1. In an electric-lighting system the combination with a variable-speed dynamo of constant-potential electric lamps, a storage battery in multiple with the lamps, an automatic switch acting at the lamp-potential to contact the dynamo to the circuit, a potential-magnet controlling the pressure of the dynamo, an automatic potential-adjuster for changing the potential of the dynamo from the lamp-pressure to the battery-charging pressure and a potential-reducer in the lamp-circuit for reducing the pressure applied to the lamps from the battery-charging pressure to the lamp-pressure.

2. In an electric-lighting system the combination of a variable-speed and variable-current dynamo, electric lamps and a storage battery, an automatic switch for connecting the dynamo to the circuit, a magnet controlling said switch and set to act at the lamp-pressure, rheostats in the lamp-circuit and in the field-magnet circuit of the dynamo and potential-adjusting devices controlling the insertion of said resistances in their respective circuits subsequent to the closure of the said switch.

3. In an electric-lighting system the combination of a variable-speed and variable-current dynamo, electric lamps and a storage battery, an automatic switch set to operate at the lamp-pressure, a regulator for varying the current output of the dynamo, a potential-magnet for said regulator responding to potential variations but independent of the dynamo-current, and adjusting devices connected with said regulator for applying to the lamps a lower potential and current dependent on the lamps' resistance and to the battery a higher charging-potential and a current dependent on the battery charge.

4. In an electric-lighting system the combination with a variable-speed dynamo, of an automatic switch for connecting it to the circuit when its potential due to speed reaches a given point, a current-changing regulator therefor comprising a rheostat in the field-magnet circuit, a potential-magnet set normally to respond to the lamp-potential and a rheostat-motor controlled by the said magnet, electric lamps and a storage battery, a resistance in the lamp-circuit and an automatic potential-adjuster for the said magnet for increasing the standard potential to which it will respond.

5. In an electric-lighting system the combination with a variable-speed dynamo of an automatic connection-switch therefor responding to a given dynamo-pressure due to speed, lamps and a storage battery in multiple, a current-changing regulator, a potential-magnet therefor, a resistance in the lamp-circuit operated by the said regulator and a potential-adjusting device for the said magnet giving a different potential for each section of lamp resistance introduced into the circuit.

6. In an electric-lighting system the combination with a variable-speed dynamo of an automatic connection-switch therefor responding to a given dynamo-pressure due to speed, a current-changing regulator for adjusting the amount of current in accordance with the lamp resistance and the battery charge, lamps and a storage battery in multiple, a potential-magnet in shunt with the lamps and battery controlling the said regulator, a resistance in the lamp branch circuit controlled thereby, and an automatic adjuster for the retracting-spring of said magnet serving to give a different potential for each section of the said resistance inserted in the circuit.

7. In an electric-lighting system the combination with a variable-speed and variable-current dynamo of an automatic connecting-switch therefor responding to a given dynamo-potential due to speed, lamps and a storage battery, a current-adjusting regulator for the said dynamo serving to adjust the amount of current generated thereby to the lamp resistance and the battery charge, and comprising a rheostat, a motor therefor, and a potential-magnet in shunt with the lamps and battery, a resistance in the lamp-circuit operated by the said motor and a potential-adjuster for the said magnet serving to change the standard line-potential as the said resistance is introduced into the lamp-circuit.

8. In an electric-lighting system the combination with a variable-speed dynamo, an automatic connection-switch therefor responding to a given potential, a rheostat in the field-magnet circuit of the dynamo, electric lamps and a storage battery, a potential-magnet in shunt with the lamps and battery for controlling the said rheostat, a potential-adjuster for the said magnet and resistances in the lamp-circuit, the said adjuster and resistance serving to differentiate the pressure applied to the lamps from that applied to the battery and a coil in the branch circuit leading to the battery for modifying the charging pressure applied to the battery.

9. In an electric-lighting system the combination with a variable-speed dynamo, an automatic switch for connecting it to the circuit at a given potential, electric lamps and a storage battery connected in multiple, a rheostat in the field-magnet circuit of the dynamo, a potential-magnet in shunt with the lamps and battery for controlling the said rheostat to maintain a constant dynamo-potential and normally set to respond to a battery-charging potential higher than that applied to the lamps, a resistance in series with the lamps and means for gradually raising the dynamo-pressure from that applied to the lamps up to the said normal battery-charging potential.

10. In an electric-lighting system, the combination with a variable-speed dynamo, of electric lamps and a storage battery operated therefrom at different pressures respectively, an automatic circuit-closer for connecting the dynamo to the circuit at the lamp-pressure, a regulator for maintaining the dynamo at the battery-charging pressure, but adjustable for pressures intermediate between the battery-pressure, and the lamp-pressure, and means for also adjusting the said regulator according to the conditions of the storage battery.

11. In an electric-lighting system, the combination with a variable-speed dynamo, of electric lamps and a storage battery operated therefrom at different pressures respectively, a potential-reducer in the lamp-circuit adjustable to correspond to differences between the dynamo-pressure and the lamp-pressure, a potential-magnet controlling the dynamo regulation, and a coil in the battery-circuit for adjusting the said magnet.

12. In an electric-lighting system, the combination with a variable-speed dynamo, of constant-potential lamps, a storage battery in multiple, an automatic connection-switch, a regulator-magnet for the dynamo measuring the dynamo-potential but set to act at the lamp-potential, an automatic potential-adjuster for subsequently changing the potential from the lamp-pressure to the battery-charging pressure and a potential-reducer for reducing the battery-charging pressure to the lamp-pressure.

Signed at Albany, New York, this 21st day of January, 1901.

JAMES F. McELROY.

Witnesses:
 FREDERICK W. CAMERON,
 CHAS. S. DU BOIS.